(12) United States Patent
Asada et al.

(10) Patent No.: US 7,948,216 B2
(45) Date of Patent: May 24, 2011

(54) CONTROL APPARATUS FOR AUTOMOTIVE ALTERNATOR AND AUTOMOTIVE POWER GENERATION SYSTEM

(75) Inventors: Tadatoshi Asada, Anjo (JP); Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 403 days.

(21) Appl. No.: 12/010,631

(22) Filed: Jan. 28, 2008

(65) Prior Publication Data

US 2008/0179890 A1 Jul. 31, 2008

(30) Foreign Application Priority Data

Jan. 30, 2007 (JP) ................................. 2007-019078

(51) Int. Cl.
*H02P 11/00* (2006.01)
*H02P 9/00* (2006.01)
*H02H 7/06* (2006.01)
*F02D 29/06* (2006.01)
*H02P 9/04* (2006.01)

(52) U.S. Cl. .......... 322/24; 290/40 B; 323/283; 323/285

(58) Field of Classification Search .................... 322/24; 323/283, 285; 290/40 B
See application file for complete search history.

(56) References Cited

U.S. PATENT DOCUMENTS

| | | | | | |
|---|---|---|---|---|---|
| 4,701,588 | A | * | 10/1987 | Fukasawa | 219/668 |
| 5,561,363 | A | * | 10/1996 | Mashino et al. | 322/25 |
| 5,581,172 | A | * | 12/1996 | Iwatani et al. | 322/28 |
| 5,736,948 | A | * | 4/1998 | Mitsuishi et al. | 341/141 |
| 5,767,636 | A | | 6/1998 | Kanazawa et al. | 318/139 |
| 6,137,247 | A | * | 10/2000 | Maehara et al. | 318/140 |
| 6,366,064 | B1 | * | 4/2002 | Reichard | 323/224 |
| 6,456,048 | B2 | * | 9/2002 | Taniguchi et al. | 322/28 |
| 6,625,525 | B2 | * | 9/2003 | Yoshino et al. | 701/22 |
| 6,812,675 | B2 | * | 11/2004 | Okamoto et al. | 322/28 |
| 6,954,052 | B2 | * | 10/2005 | Fujita et al. | 322/28 |
| 7,098,628 | B2 | * | 8/2006 | Maehara et al. | 322/24 |
| 7,102,332 | B1 | * | 9/2006 | Sasaki et al. | 322/28 |

(Continued)

FOREIGN PATENT DOCUMENTS

EP 1 443 626 A2 8/2004

(Continued)

OTHER PUBLICATIONS

May 18, 2010 European Search Report for European Patent Application No. 08001429.3.

*Primary Examiner* — T C Patel
*Assistant Examiner* — Pedro J Cuevas
(74) *Attorney, Agent, or Firm* — Oliff & Berridge, PLC (57) ABSTRACT

A control apparatus controls power generation of an electric generator and communicates with an external control apparatus. The control apparatus includes: a control circuit that controls the power generation of the electric generator according to a command signal transmitted from the external control apparatus; means for resetting the control circuit; and means for informing the external control apparatus of a power generation condition of the electric generator by transmitting a condition signal, the condition signal indicating both the power generation condition of the electric generator and information on whether a reset of the control circuit is made by the resetting means. With such a configuration, when the control circuit is reset due to, for example, noises, the control apparatus can reliably inform the external control apparatus of the reset of the control circuit.

4 Claims, 8 Drawing Sheets

U.S. PATENT DOCUMENTS

| | | | |
|---|---|---|---|
| 7,285,937 B2* | 10/2007 | Asada | 322/24 |
| 7,285,938 B2* | 10/2007 | Aoyama | 322/28 |
| 7,292,008 B2* | 11/2007 | Asada | 322/24 |
| 7,304,455 B2* | 12/2007 | Okahara et al. | 322/28 |
| 7,391,186 B2* | 6/2008 | Asada | 322/28 |
| 7,446,518 B2* | 11/2008 | Carpenter et al. | 323/285 |
| 7,750,602 B2* | 7/2010 | Asada | 320/128 |
| 7,777,460 B2* | 8/2010 | Schuellein | 323/272 |
| 7,777,469 B2* | 8/2010 | Nguyen | 323/282 |
| 7,791,327 B2* | 9/2010 | Liu | 323/285 |
| 7,812,469 B2* | 10/2010 | Asada | 290/40 B |
| 2005/0087991 A1 | 4/2005 | Matsuoka | 290/40 C |
| 2005/0194952 A1* | 9/2005 | Carpenter et al. | 323/283 |
| 2007/0188152 A1* | 8/2007 | Asada | 322/37 |
| 2010/0181981 A1* | 7/2010 | Takemura | 323/282 |
| 2010/0188127 A1* | 7/2010 | Cheng et al. | 327/237 |
| 2010/0194370 A1* | 8/2010 | Cheng | 323/285 |
| 2010/0254202 A1* | 10/2010 | Asauchi | 365/189.17 |
| 2010/0257327 A1* | 10/2010 | Kosugi | 711/162 |
| 2010/0290292 A1* | 11/2010 | Tanizaki et al. | 365/185.22 |
| 2010/0327836 A1* | 12/2010 | Li et al. | 323/283 |
| 2010/0328630 A1* | 12/2010 | Shirasu et al. | 353/85 |
| 2011/0006606 A1* | 1/2011 | Hashimoto et al. | 307/52 |

FOREIGN PATENT DOCUMENTS

| | | |
|---|---|---|
| JP | A-08-275407 | 10/1996 |
| JP | A-2002-171688 | 6/2002 |
| JP | A-2006-296094 | 10/2006 |

* cited by examiner

CONTROL APPARATUS FOR AUTOMOTIVE ALTERNATOR AND AUTOMOTIVE POWER GENERATION SYSTEM

CROSS-REFERENCE TO RELATED APPLICATION

This application is based on and claims priority from Japanese Patent Application No. 2007-19078, filed on Jan. 30, 2007, the content of which is hereby incorporated by reference in its entirety into this application.

BACKGROUND OF THE INVENTION

1. Technical Field of the Invention

The present invention relates generally to control apparatus for electric generators and electric power generation systems.

More particularly, the invention relates to a control apparatus for an automotive alternator, which can reliably inform a reset thereof to an engine control unit (ECU), and an automotive power generation system that includes such a control apparatus.

2. Description of the Related Art

A conventional power generation system for a motor vehicle, such as the one disclosed in U.S. Pat. No. 5,767,636, includes an automotive alternator, a voltage regulator for regulating the output voltage of the alternator, and an ECU that communicates with the voltage regulator for controlling power generation of the alternator. More specifically, the ECU sends to the voltage regulator a command signal that represents command values for power generation control parameters; the voltage regulator regulates the output voltage of the alternator according to the command signal. With such a configuration, it is possible to suitably control the power generation of the alternator according to the operating condition of the engine.

Moreover, the alternator is generally installed in an engine compartment and supplies electric power to both a battery and electric loads via a charge line. The alternator also supplies power to the voltage regulator which is generally built in the alternator.

Furthermore, the voltage regulator may be falsely reset due to various noises imposed on the power lines of the power generation system. For example, on the power lines, ignition noises may be imposed in the case of the engine being a gasoline engine; power noises may be imposed when the alternator drives an inductive load, such as a motor; great voltage ripples may be imposed when the power generation system operates without the battery.

When the voltage regulator is reset, all the command values for the power generation control parameters having been sent from the ECU to the voltage regulator are initialized. However, since the ECU cannot be aware of the initialization of those command values, it continues its control on the power generation of the alternator on the assumption that those command values are still effective in the voltage regulator. As a result, malfunctions will be caused in performing a stabilization control of the output voltage of the alternator, a fuel economy-improving control, or a stabilization control of idle rotation. Furthermore, when the command values for the power generation control parameters are incorrectly initialized in the reset of the voltage regulator caused by the noises, the voltage regulator can no longer suitably control the alternator; however, the ECU cannot be aware of such a wrong condition of the voltage regulator.

SUMMARY OF THE INVENTION

The present invention has been made in view of the above-mentioned problems.

It is, therefore, one object of the present invention to provide a control apparatus for an automotive alternator, which can reliably inform a reset thereof to an external control apparatus that communicates with the control apparatus for controlling power generation of the alternator.

It is another object of the present invention to provide an automotive power generation system, in which a first control apparatus can reliably inform a reset thereof to a second control apparatus that communicates with the first control apparatus for controlling power generation of an automotive alternator.

According to one aspect of the present invention, there is provided a control apparatus which controls power generation of an electric generator and communicates with an external control apparatus. The control apparatus includes: a control circuit that controls the power generation of the electric generator according to a command signal transmitted from the external control apparatus; means for resetting the control circuit; and means for informing the external control apparatus of a power generation condition of the electric generator by transmitting a condition signal, the condition signal indicating both the power generation condition of the electric generator and information on whether a reset of the control circuit is made by the reseting means.

With the above configuration, when the control circuit is reset due to, for example, noises, the control apparatus can reliably inform the external control apparatus of the reset of the control circuit.

According to a further implementation, the informing means transmits the condition signal in a cycle of less than a half of a time constant of field current supplied to the electric generator.

Specifying the cycle as above, it is possible for the control apparatus to inform a reset of the control circuit before a great change in the power generation of the electric generator takes place due to the reset.

Further, when a reset of the control circuit is made by the resetting means, the informing means sets a reset flag to a first value, cyclically transmits for a predetermined time period the condition signal which represents the first value of the reset flag, and then sets the reset flag to a second value, the first value of the reset flag indicating that a reset of the control circuit is made, the second value of the reset flag indicating that no reset of the control circuit is made, the predetermined time period being longer than at least twice the cycle in which the condition signal is transmitted.

Specifying the predetermined time period as above, when the control circuit is repeatedly reset in some fault conditions, the external control apparatus can detect the occurrence rate of reset for the control circuit. Consequently, on the basis of the occurrence rate of reset, the external control apparatus can detect the fault conditions and optimally determine the command signal.

Moreover, in the above control apparatus, the command signal may represent command values for power generation control parameters, and the condition signal may represent actual values of the power generation control parameters. The power generation control parameters may include an output voltage of the electric generator, field current supplied to the electric generator, and a duty of a power transistor for controlling the field current. The electric generator may be an automotive alternator; the control apparatus may be a voltage regulator for regulating an output voltage of the automotive alternator; the external control apparatus may be an engine control unit.

According to another aspect of the present invention, there is provided an electric power generation system which includes an electric generator, and first and second control apparatus that communicate with each other to control power generation of the electric generator. The first control apparatus includes: a control circuit that controls the power generation of the electric generator according to a command signal transmitted from the second control apparatus; means for resetting the control circuit; and means for informing the second control apparatus of a power generation condition of the electric generator by transmitting a condition signal, the condition signal indicating both the power generation condition of the electric generator and information on whether a reset of the control circuit is made by the reseting means. The second control apparatus determines whether a reset of the control circuit of the first control apparatus is made on the basis of the condition signal transmitted from the first control apparatus.

With the above configuration, when the control circuit is reset due to, for example, noises, the first control apparatus can reliably inform the second control apparatus of the reset of the control circuit.

According to a further implementation, when it is determined that a reset of the control circuit of the first control apparatus is made, the second control circuit transmits the command signal to the first control circuit.

With the above configuration, when the command signal is lost in the first control apparatus due to the reset, it is still possible for the first control apparatus to immediately resume a suitable control on the power generation of the electric generator according to the command signal transmitted by the second control apparatus.

Further, when a reset of the control circuit is made by the resetting means, the informing means of the first control apparatus sets a reset flag to a first value, transmits to the second control apparatus the condition signal which represents the first value of the reset flag, and then sets the reset flag to a second value upon safe receipt of the command signal which is transmitted by the second control apparatus in response to the condition signal, the first value of the reset flag indicating that a reset of the control circuit is made, the second value of the reset flag indicating that no reset of the control circuit is made.

With the above configuration, the first control apparatus can be prevented from further informing the second control apparatus of the reset of the control circuit after the safe receipt of the command signal.

Moreover, in the above electric power generation system, the command signal may represent command values for power generation control parameters, and the condition signal may represent actual values of the power generation control parameters. The power generation control parameters may include an output voltage of the electric generator, field current supplied to the electric generator, and a duty of a power transistor for controlling the field current. The electric power generation system may be for use in a motor vehicle with the electric generator being an automotive alternator, the first control apparatus being a voltage regulator for regulating an output voltage of the automotive alternator, and the second control apparatus being an engine control unit for controlling an engine of the vehicle.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

One preferred embodiment of the present invention will be described hereinafter with reference to FIGS. 1-7.

Figure 1:
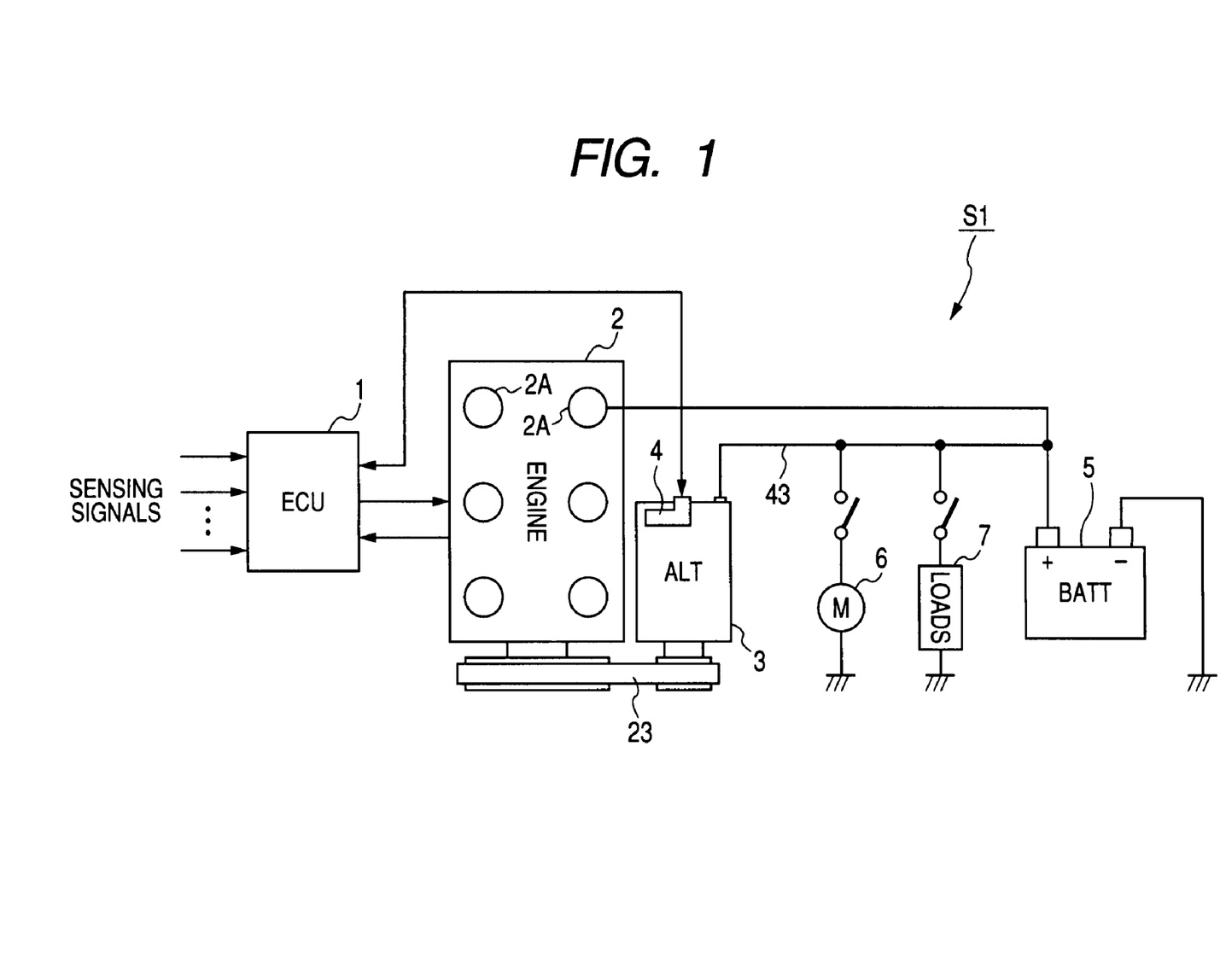
FIG. 1 is a schematic diagram showing the overall configuration of an automotive power generation system according to an embodiment of the invention.

FIG. 1 shows the overall configuration of an automotive power generation system S1 according to the present embodiment. As shown, the power generation system S1 includes an Engine Control Unit (ECU) 1, an engine 2, an automotive alternator (abbreviated to ALT in FIG. 1) 3, a voltage regulator 4, a battery (abbreviated to BATT in FIG. 1) 5, a motor 6, and electric loads 7.

The ECU 1 controls the output of the engine 2 on the basis of sensing signals output from various sensors for sensing the running condition of a vehicle driven by the engine 2. The ECU 1 also functions as an external control apparatus to the alternator 3.

The alternator 3 is driven by the engine 2 via a belt 23. The electric power generated by the alternator 3 is used to charge the battery 5 and power the motor 6 and electric loads 7. More specifically, an output terminal of the alternator 3 is electrically connected to a positive terminal of the battery 5 via a charge line 43; both the motor 6 and electric loads 7 are connected to the charge line 43 via respective switches. In addition, the engine 2 includes a plurality of ignition devices 2A, each of which is powered by the battery 5 to ignite the air/fuel mixture in a corresponding a cylinder of the engine 2.

The voltage regulator 4, which is built in the alternator 3 in the present embodiment, regulates the output voltage of alternator 3 by controlling field current supply to the alternator 3.

Figure 2:
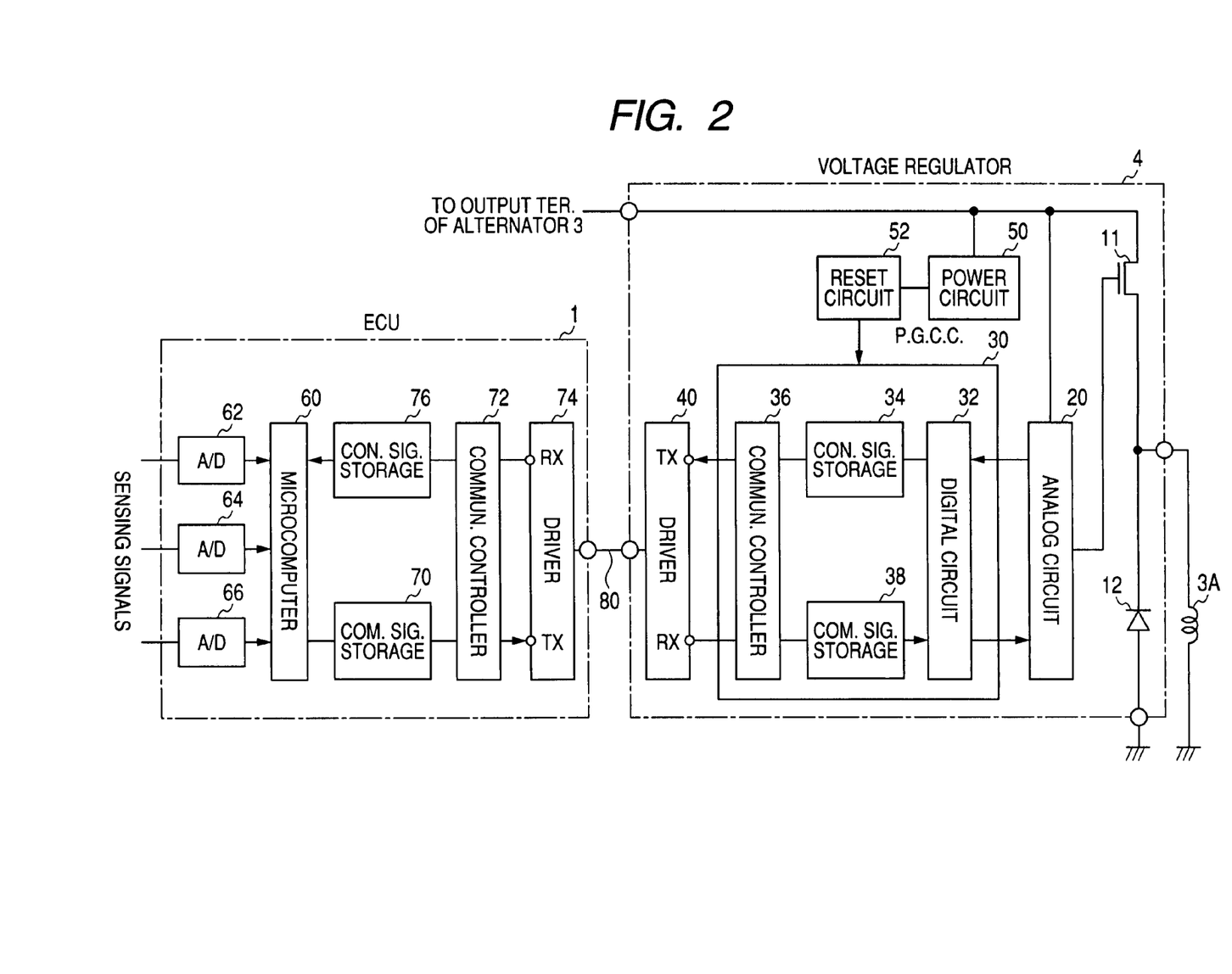
FIG. 2 is a functional block diagram showing the detailed configuration of an ECU and a voltage regulator in the power generation system.

FIG. 2 shows the detailed configuration of the ECU 1 and voltage regulator 4. As shown, the voltage regulator 4 includes a power transistor 11, a free-wheeling diode 12, an analog circuit 20, a power generation control circuit (abbreviated to P.G.C.C. in FIG. 2) 30, a driver 40, a power circuit 50, and a reset circuit 52.

The power transistor 11 is connected in series with a field coil 3A of the alternator 3, so that the field coil 3A can be supplied with field current when the power transistor 11 is turned on. More specifically, the power transistor 11 has its drain connected to the output terminal of the alternator 3 and its source connected to the field coil 3A.

The free-wheeling diode 12 is connected in parallel with the field coil 3A, so that the electric energy stored in the field coil 3A can be removed from the field coil 3A when the power transistor 11 is turned off. More specifically, the free-wheeling diode 12 has its cathode connected to the source of the power transistor 11 and its anode grounded.

The analog circuit 20 has both a function of detecting the power generating condition of the alternator 3 and a function of driving the power transistor 11 by sending a drive signal to the gate of the power transistor 11. The power generating condition of the alternator 3 is represented by actual values of power generation control parameters, such as the output voltage of the alternator 3, the field current supplied to the field coil 3A, and the duty of the power transistor 11. To this end, though not shown in FIG. 2, the analog circuit 20 includes a driver for driving the power transistor 11, an analog control circuit for controlling the driver, and detecting circuits for respectively detecting the output voltage of the alternator 3, the field current supplied to the field coil 3A, and the duty of the power transistor 11. Moreover, the analog control circuit is controlled by the power generation control circuit 30.

The power generation control circuit 30 has both a function of controlling the power generation of the alternator 3 according to a command signal sent from the ECU 1 and a function of sending to the ECU 1 a condition signal that indicates the power generating condition of the alternator 3. The command signal represents command values for the power generation control parameters, whereas the condition signal represents the actual values of the power generation control parameters detected by the analog circuit 20. To this end, as shown in FIG. 2, the power generation control circuit 30 includes a digital circuit 32, a condition signal storage 34 in which the condition signal (i.e., the actual values of the power generation control parameters) is stored, a communication controller 36, and a command signal storage 38 in which the command signal (i.e., the command values for the power generation control parameters) is stored.

The digital circuit 32 generates the condition signal on the basis of the actual values of the power generation control parameters detected by the analog circuit 20. The generated condition signal is then stored in the condition signal storage 34. The digital circuit 32 also has a power generation control function which is to be described in detail later.

Figure 3:
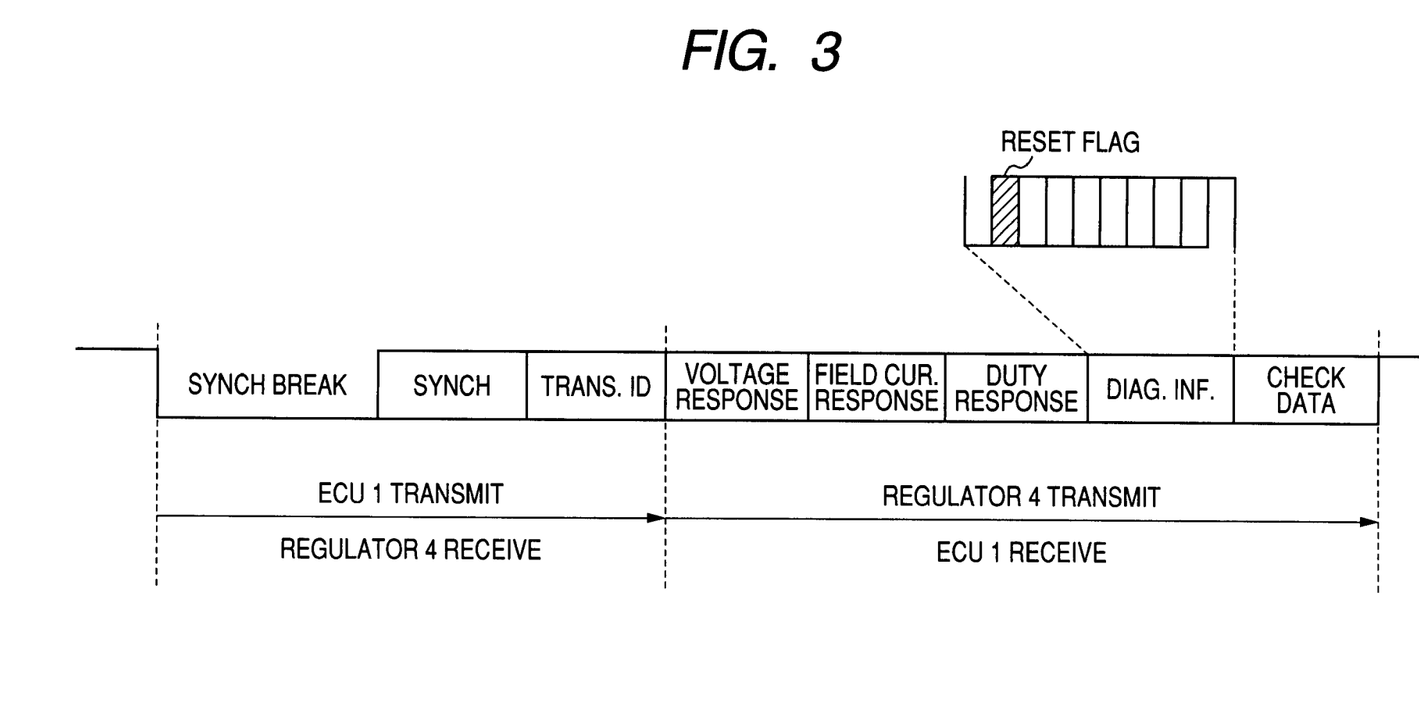
FIG. 3 is a schematic diagram illustrating a digital format of a condition signal that is transmitted from the voltage regulator to the ECU via a serial communication according to LIN protocol.

FIG. 3 shows a digital format of the condition signal that is transmitted from the voltage regulator 4 to the ECU 1 via a serial communication according to the LIN protocol.

As shown in FIG. 3, the condition signal includes, after the sync field and transmission ID field, a voltage response field, a field current response field, a duty response field, a diagnostic information field, and a check data field.

The transmission ID field contains an identifier which is assigned according to a transmission request from the ECU 1 and has a value set according to the transmission request.

The voltage response field contains response data representing the actual value of the output voltage of the alternator 3 which is detected by the analog circuit 20.

The field current response field contains response data representing the actual value of the field current supplied to the field coil 3A which is detected by the analog circuit 20.

The duty response field contains response data representing the actual value of the duty of the power transistor 11 which is detected by the analog circuit 20.

The diagnostic information field contains response data of predetermined bits representing diagnostic information. In the present embodiment, the head bit of the diagnostic information field is used for a reset flag which is described in detail later.

The check data field contains data for check, such as parity and CRC data.

Referring again to FIG. 2, the communication controller 36 of the power generation control circuit 30 has a function of modulating the condition signal stored in the condition signal storage 34 into the digital format shown in FIG. 3.

The driver 40 functions both as a transmitter to transmit the modulated condition signal to the ECU 1 via a communication line 80 and as a receiver to receive a modulated command signal from the ECU 1 via the communication line 80.

In addition, the above-described communication controller 36 also has a function of demodulating the modulated command signal received by the driver 40. The command signal demodulated by the communication controller 36 is then stored in the command signal storage 38.

Figure 4:
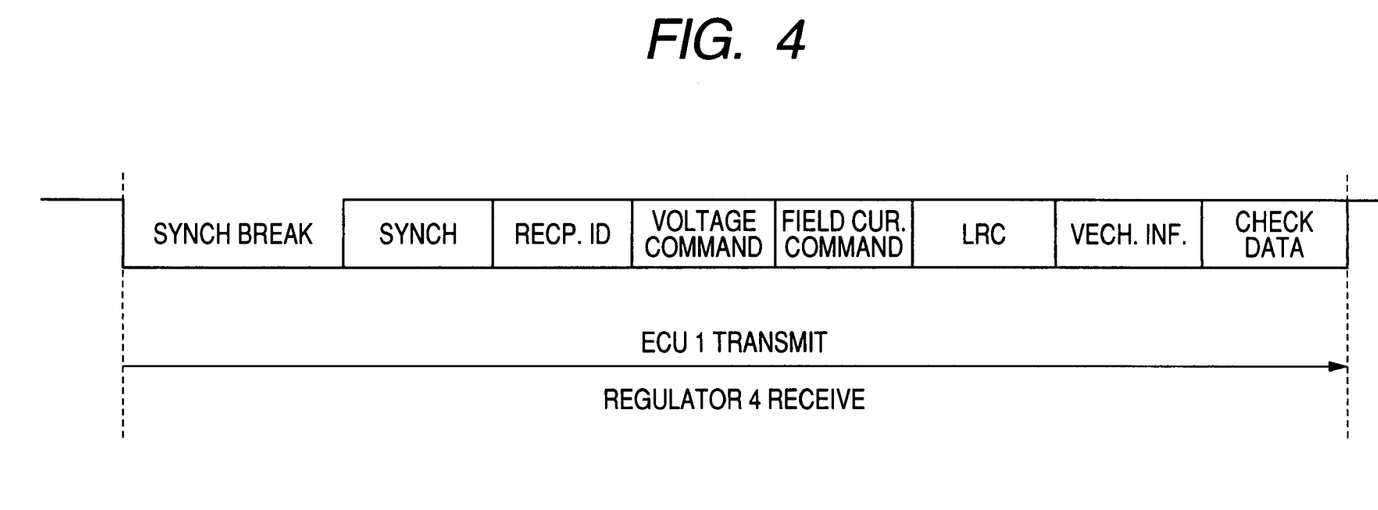
FIG. 4 is a schematic diagram illustrating a digital format of a command signal that is transmitted from the ECU to the voltage regulator via the serial communication.

FIG. 4 shows a digital format of the command signal that is transmitted from the ECU 1 to the voltage regulator 4 via the serial communication according to the LIN protocol.

As shown in FIG. 4, the command signal includes, after the sync filed and reception ID field, a voltage command field, a field current command field, an LRC field, a vehicle information field, and a check data field.

The voltage command field contains command data representing the target value of the output voltage of the alternator 3.

The field current command field contains command data representing limit values of the field current supplied to the field coil 3A.

The LRC field contains command data representing limit values of changes in the field current supplied to the field coil 3A and in the duty of the power transistor 11 when the total load of the alternator 3 (i.e., the motor 6 plus the electric loads 7) changes rapidly.

Turning back to FIG. 2, the digital circuit 32 controls, via the analog circuit 20, the power generation of the alternator 3 according to the command signal stored in the command signal storage 38. For example, in one control mode, the digital circuit 32 controls the analog circuit 20 to drive the power transistor 11 so as to bring the actual value of the output voltage detected by the analog circuit 20 into agreement with the target value of the output voltage indicated by the command signal. In another control mode, the digital circuit 32 controls the analog circuit 20 to drive the power transistor 11 so as to limit the actual value of the field current detected by the analog circuit 20 within the limit values of the field current indicated by the command signal. In yet another control mode, the digital circuit 32 controls the analog circuit 20 to drive the power transistor 11 so as to limit the changes in the actual values of the field current and duty of the power transistor 11 detected by the analog circuit 20 within the respective limit values of those changes indicated by the command signal.

The power circuit 50 serves to supply electric power to each component of the voltage regulator 4.

The reset circuit 52 resets the power generation control circuit 30 at predetermined timings. For example, the reset operation of the reset circuit 52 is generally made when the voltage regulator 4 is activated. However, the reset operation also may be falsely made when great ignition noises are induced in sync with the ignition timings of the ignition devices 2A and transmitted to the voltage regulator 4 via the output terminal of the alternator 3. In the reset operation, the reset circuit 52 sends a reset signal to the power generation control circuit 30. Upon receipt of the reset signal, the power generation control circuit 30 is reset, so that the command signal (i.e., the command values) stored in the command signal storage 38 is initialized. After the reset of the power generation control circuit 30, the digital circuit 32 sets to "1" the value of the reset flag which is the head bit of the condition signal stored in the condition signal storage 34.

The ECU 1 includes, as shown in FIG. 2, a microcomputer 60, A/D converters 62, 64, and 66, a command signal storage 70 in which the command signal (i.e., the command values for the power generation control parameters) is stored, a communication controller 72, a driver 74, and a condition signal storage 76 in which the condition signal (i.e., the actual values of the power generation control parameters) is stored.

The microcomputer 60 adjusts, for example, the fuel injection quantities of the engine 2 and the ignition timings of the ignition devices 2A on the basis of the sensing signals input via the A/D converters 62, 64, and 66, thereby controlling the engine 2. The sensing signals are output from various sensors, such as a vehicle speed sensor, a throttle sensor, and an O2 sensor. Further, the microcomputer 60 generates the command signal according to the operating condition of the engine 2. The generated command single is then stored in the command signal storage 70.

The communication controller 72 has a function of modulating the command signal stored in the command signal storage 70 into the digital format shown in FIG. 4.

The driver 74 functions both as a transmitter to transit the modulated command signal to the voltage regulator 4 via the communication line 80 and as a receiver to receive the modulated condition signal from the voltage regulator 4 via the communication line 80.

In addition, the above-described communication controller 72 also has a function of demodulating the modulated condition signal received by the driver 74. The condition signal demodulated by the communication controller 72 is then stored in the condition single storage 76 and further used by the microcomputer 60 to control the engine 2.

In the present embodiment, the reset circuit 52 makes up means for resetting the power generation control circuit 30; the digital circuit 32, condition signal storage 34, communication controller 36, and driver 40 together make up means for informing the ECU 1 of a reset of the power generation control circuit.

After having described the configurations of the ECU 1 and voltage regulator 4 according to the present embodiment, operations thereof will be described hereinafter.

Figure 5:
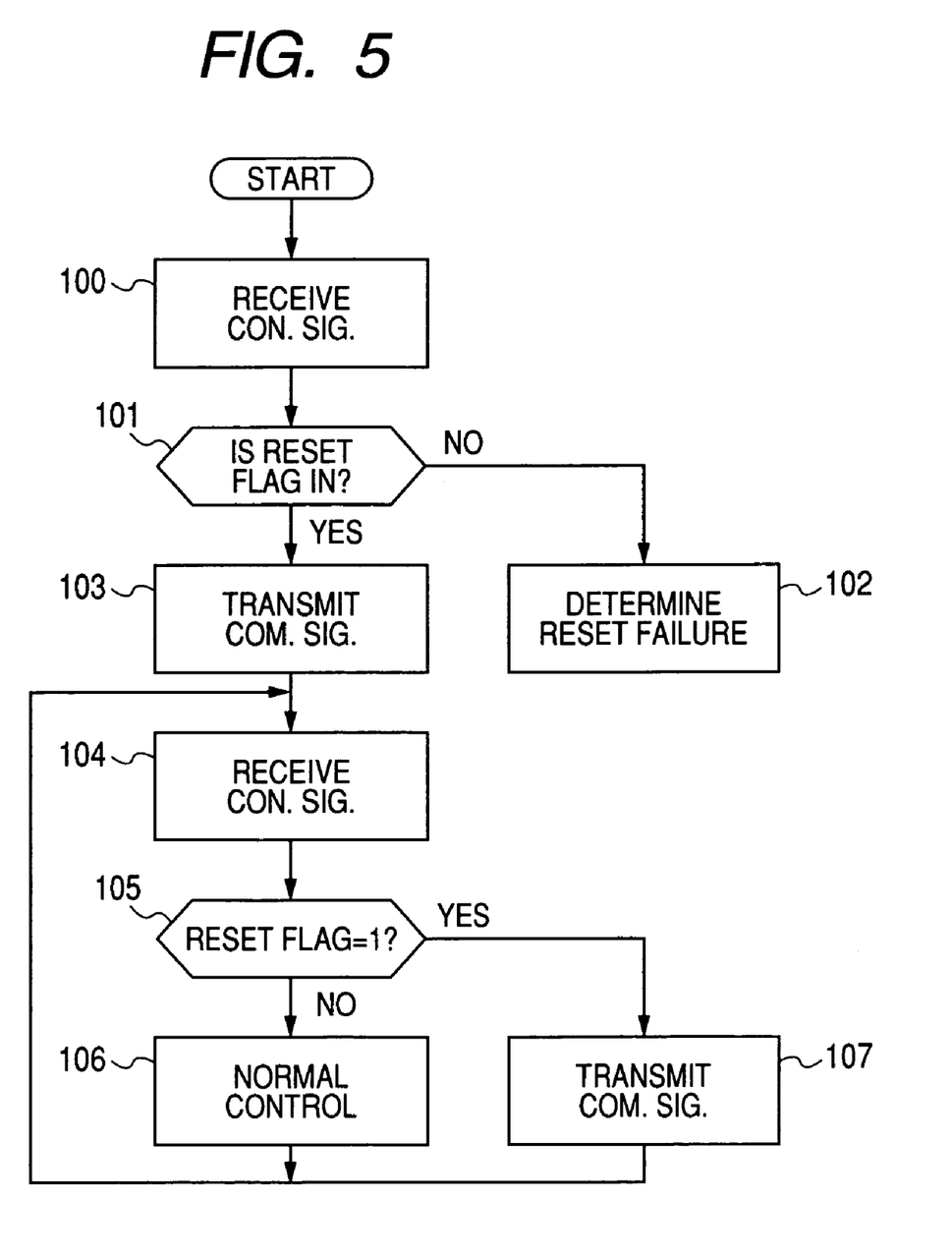
FIG. 5 is a flow chart illustrating a process of the ECU for controlling the power generation of an automotive alternator in cooperation with the voltage regulator.

FIG. 5 shows a process of the ECU 1 for controlling the power generation of the alternator 3 in cooperation with the voltage regulator 4.

First, at step 100, the ECU 1 receives the condition signal transmitted by the voltage regulator 4.

At step 101, the ECU 1 (more specifically, the microcomputer 60 thereof determines whether or not the reset flag is included in the condition signal.

If the determination at step 101 produces a "NO" answer, then the process proceeds to step 102, at which the ECU 1 determines a failure in resetting the power generation control circuit 30 of the voltage regulator 4 and performs necessary processes.

For example, when the condition signal transmitted from the voltage regulator 4 includes no diagnostic information field, the determination at step 101 will produce a "NO" answer. In this case, the ECU 1 determines that a reset of the power generation control circuit 30 of the voltage regulator 4 has failed and takes necessary steps.

On the contrary, if the determination at step 101 produces a "YES" answer, then the process goes on to step 103, at which the ECU 1 transmits to the voltage regulator 4 the command signal that indicates the command values for the power generation control parameters.

After that, at step 104, the ECU 1 receives again the condition signal (more precisely, the next condition signal).

At step 105, the ECU 1 determines whether or not the value of the reset flag in the condition signal received at step S104 is equal to "1".

If the determination at step 105 produces a "NO" answer, then the process proceeds to step 106, at which the ECU 1 performs its normal control on the power generation of the alternator 3. Thereafter, the process returns to step 104 to repeat the subsequent steps.

More specifically, in this case, the ECU 1 determines that no reset of the power generation control circuit 30 of the voltage regulator 4 has been made in the present cycle, and thus does not send to the voltage regulator 4 the command values for the power generation control parameters.

On the contrary, if the determination at step 105 produces a "YES" answer, then the process goes on to step 107, at which the ECU 1 transmits the command signal to the voltage regulator 4. Then, the process returns to step 104 to repeat the subsequent steps.

More specifically, in this case, the ECU 1 determines that a reset of the power generation control circuit 30 of the voltage regulator 4 has been made in the present cycle, and thus sends to the voltage regulator 4 the command values for the power generation control parameters by transmitting the command signal.

Figure 6:
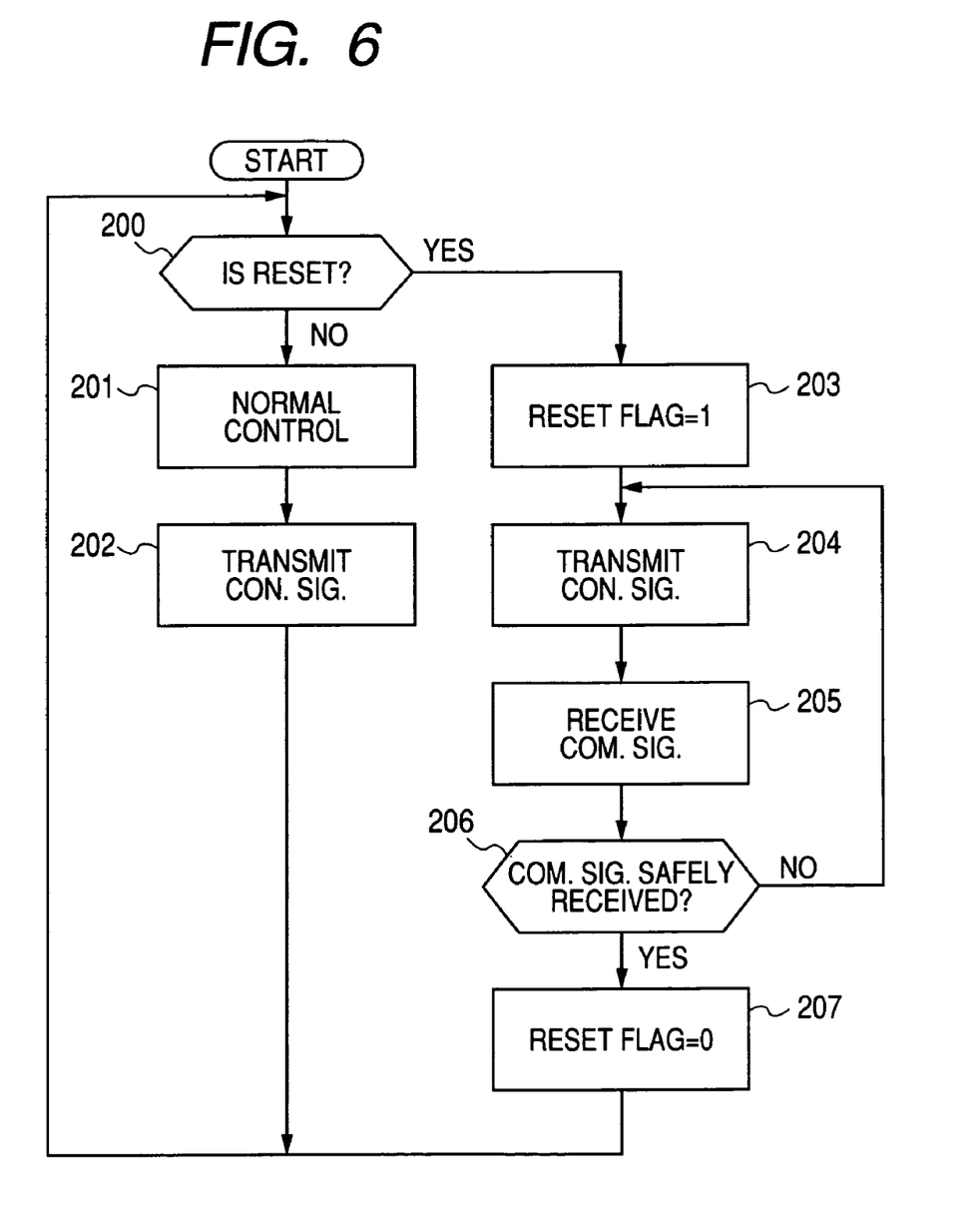
FIG. 6 is a flow chart illustrating a process of the voltage regulator for controlling the power generation of the alternator in cooperation with the ECU.

FIG. 6 shows a process of the voltage regulator 4 for controlling the power generation of the alternator 3 in cooperation with the ECU 1.

First, at step 200, the voltage regulator 4 (More specifically, the digital circuit 32 thereof determines whether a reset of the power generation control circuit 30 has been made in the present cycle.

If the determination at step 200 produces a "NO" answer, then the process proceeds to step 201, at which the voltage regulator 4 performs its normal control on the power generation of the alternator 3.

More specifically, at step 201, the digital circuit 32 controls the power generation of the alternator 3 according to the command signal stored in the command signal storage 38; the digital circuit 32 also generates the condition signal which represents the actual values of the power generation control parameters most recently detected by the analog circuit 20 and the value of the reset flag being equal to "0".

At succeeding step 202, the voltage regulator 4 transmits to the ECU 1 the condition signal generated at step 201. Then, the process returns to step 200 to repeat the subsequent steps.

On the contrary, if the determination at step 200 produces a "YES" answer, then the process goes on to step 203, at which the value of the reset flag is set to "1".

More specifically, at step 203, the digital circuit 32 generates the condition signal which represents the actual values of the power generation control parameters most recently detected by the analog circuit 20 and the value of the reset flag being equal to "1".

At succeeding step 204, the voltage regulator 4 transmits to the ECU 1 the condition signal generated at step 203.

At step 205, the voltage regulator 4 receives the command signal that is transmitted by the ECU 1 in response to the condition signal transmitted at step 204.

At step 206, the voltage regulator 4 determines whether the command signal has been safely received at step 205.

If the determination at step 206 produces a "NO" answer, then the process returns to step 204 to repeat the subsequent steps.

On the contrary, if the determination at step 206 produces a "YES" answer, then the process proceeds to step 207.

At step 207, the voltage regulator 4 sets to "0" the value of the reset flag in the condition signal stored in the condition signal storage 34. Then, the process returns to step 200 to repeat the subsequent steps.

Figure 7:
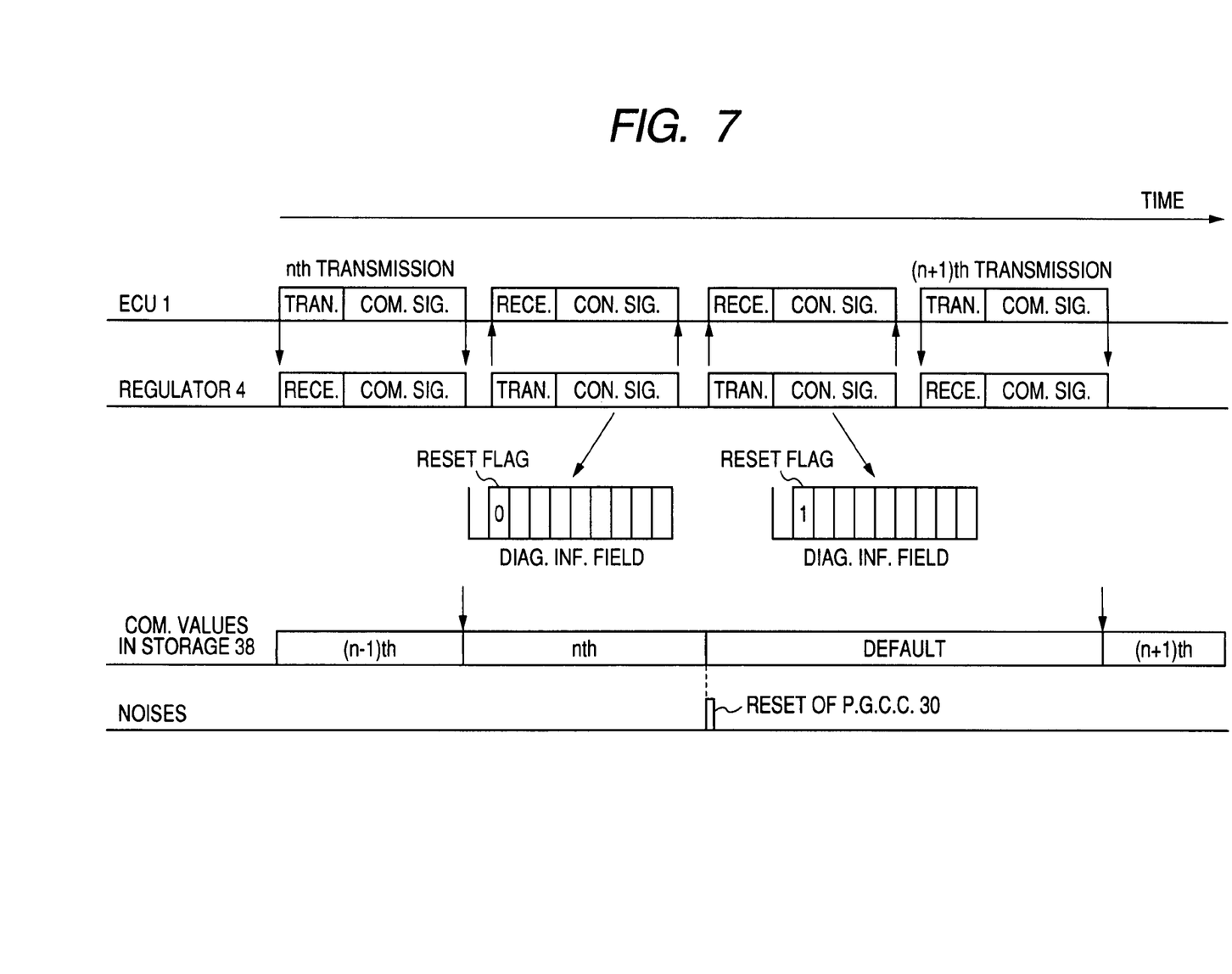
FIG. 7 is a schematic view illustrating a sequence of the serial communication between the ECU and alternator.

FIG. 7 shows a sequence of the serial communication between the ECU 1 and voltage regulator 4.

As shown in FIG. 7, before completion of the nth transmission of the command signal by the ECU 1, the command values for the power generation control parameters stored in the command signal storage 38 of the voltage regulator 4 are those values which are obtained through the (n−1)th transmission of the command signal by the ECU 1.

After completion of the nth transmission of the command signal by the ECU 1, i.e., after completion of the nth reception of the command signal by the voltage regulator 4, the command values stored in the command signal storage 38 are those values which are obtained through the nth transmission of the command signal.

Moreover, at this stage, the value of the reset flag in the condition signal transmitted from the voltage regulator 4 to the ECU 1 is equal to "0".

When a reset of the power generation control circuit (abbreviated to P.G.C.C. in FIG. 7) 30 of the voltage regulator 4 is made due to noises, the command values stored in the command signal storage 38 are initialized to default values.

Then, the voltage regulator 4 transmits to the ECU 1 the condition signal which represents the value of the reset flag being equal to "1". Upon receipt of the condition signal, the ECU 1 conducts the (n+1)th transmission of the command signal.

After completion of the (n+1)th transmission of the command signal by the ECU 1, i.e., after completion of the (n+1)th reception of the command signal by the voltage regulator 4, the default values in the command signal storage 38 are overwritten with the command values which are obtained through the (n+1) transmission of the command signal.

As above, in the automotive power generation system S1 according to the present embodiment, when the power generation control circuit 30 is reset due to noises imposed on the charge line 43, the voltage regulator 4 can reliably inform the ECU 1 of the reset of the power generation control circuit 30.

Further, upon being informed of the reset of the power generation control circuit 30, the ECU 1 immediately transmits to the voltage regulator 4 the command signal that represents the command values for the power generation control parameters. Therefore, though the command values stored in the power generation control circuit 30 were initialized during the reset, it is still possible for the voltage regulator 4 to immediately resume a suitable control on the power generation of the alternator 3 according to the command signal transmitted by the ECU 1.

Furthermore, when the reset of the power generation control circuit 30 is made, the voltage regulator 4 sets the value of the reset flag to "1", transmits to the ECU 1 the condition signal which represents the value "1" of the reset flag, and then sets the reset flag to "0" upon safe receipt of the command signal which is transmitted by the ECU 1 in response to the condition signal.

With the above configuration, the voltage regulator 4 can be prevented from further informing the ECU 1 of the reset of the power generation control circuit 30 after the safe receipt of the command signal.

While the above particular embodiment of the present invention has been shown and described, it will be understood by those skilled in the art that various modifications, changes, and improvements may be made without departing from the spirit of the invention.

Figure 8:
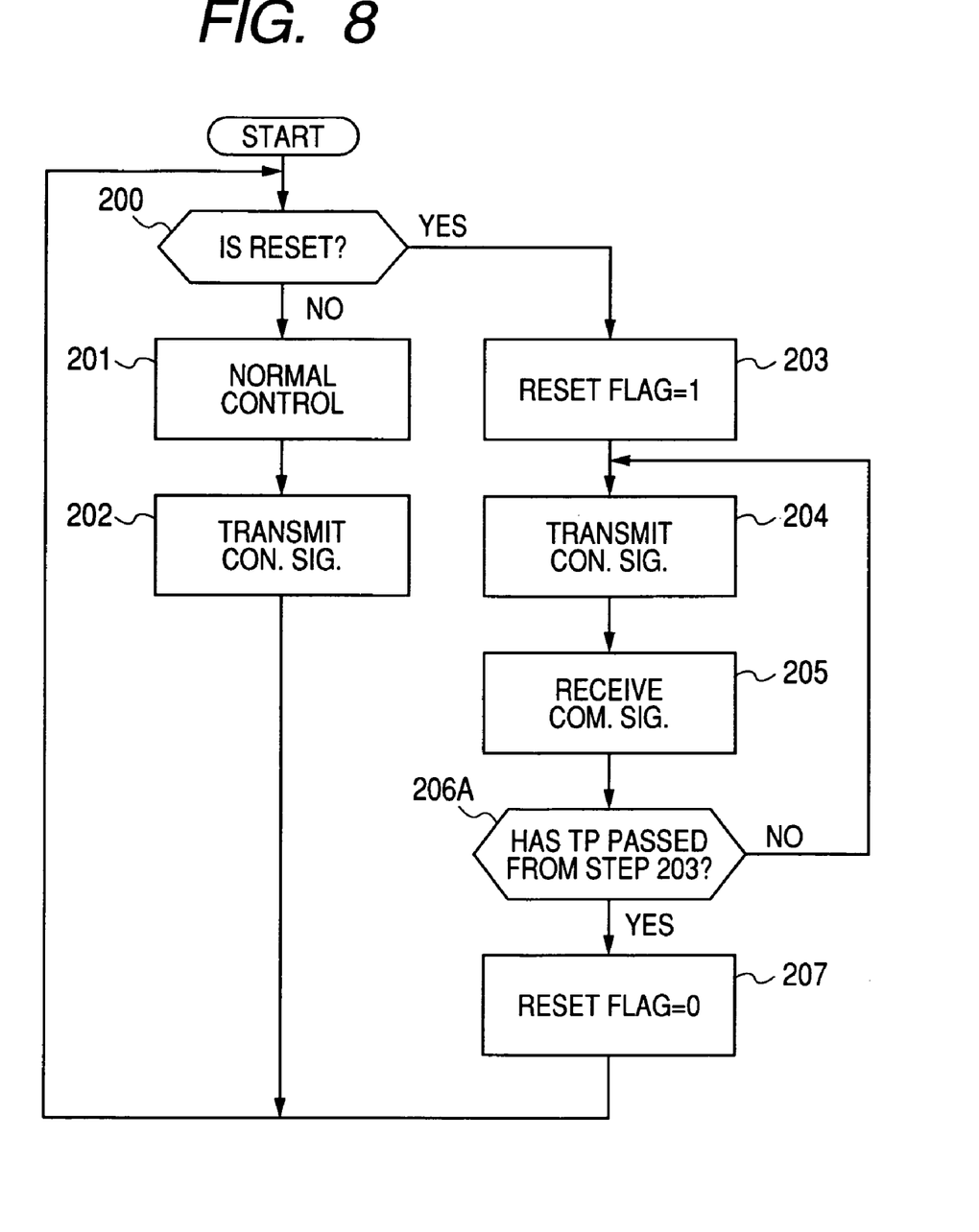
FIG. 8 is a flow chart illustrating a variation of the process of FIG. 6.

For example, the voltage regulator 4 can be modified to perform, instead of the process shown in FIG. 6, a process shown in FIG. 8.

The process of FIG. 8 differs from the process of FIG. 6 only in that step 206 of FIG. 6 is replaced with step 206A in FIG. 8. At step 206A, a determination is made as to whether a predetermined time period TP has passed from step 203.

More specifically, according to the process of FIG. 8, the voltage regulator 4 cyclically transmits the condition signal which represents the value "1" of the reset flag for the predetermined time period TP (i.e., steps 204, 205, and 206A), and then sets the value of reset flag to "0".

Further, the cycle Tc, in which the condition signal is transmitted, is less than a half of the time constant of the field current supplied to the field coil 3A of the alternator 3.

Specifying the cycle Tc as above, it is possible for the voltage regulator 4 to inform a reset of the power generation control circuit 30 before a great change in the power generation of the alternator 3 takes place due to the reset.

Furthermore, the predetermined time period Tp, for which the condition signal is cyclically transmitted, is longer than at least twice the cycle Tc.

Specifying Tp as above, when the power generation control circuit 30 is repeatedly reset in some fault conditions, the ECU 1 can detect the occurrence rate of reset for the power generation control circuit 30. The fault conditions may include, for example, conditions where the noises imposed on the charge line 43 change with the rotational speed of the engine or great voltage ripples occur due to a disconnection of the charge line 43 from the battery 5.

More specifically, suppose that the cycle Tc is 20 ms and the predetermined time period Tp is 200 ms. Then, when no further reset of the power generation control circuit 30 is made for the predetermined time period Tp, the ECU 1 will receive the condition signal transmitted from the voltage regulator 4 10 times. On the contrary, when further resets are made for the predetermined time period Tp, the ECU 1 will receive the condition signal less than 10 times; this is because the voltage regulator 4 cannot transmit the condition signal during the resets of the power generation control circuit 30. Accordingly, the ECU 1 can detect the occurrence rate of reset for the power generation control circuit 30 on the basis of the number of times it receives the condition signal transmitted from the voltage regulator 4.

Consequently, on the basis of the occurrence rate of reset, the ECU 1 can detect the fault conditions and optimally determine the command signal (more specifically, the command values for the power generation control parameters).

Moreover, although the previous embodiment is directed to the automotive power generation system S1, the invention also can be applied to other control apparatus for electric generators and electric power generation systems.

What is claimed is:

1. A control apparatus which controls power generation of an electric generator and communicates with an external control apparatus, the control apparatus comprising:

a control circuit that controls the power generation of the electric generator according to a command signal transmitted from the external control apparatus;

means for resetting the control circuit; and means for informing the external control apparatus of a power generation condition of the electric generator by transmitting a condition signal, the condition signal indicating both the power generation condition of the electric generator and information on whether a reset of the control circuit is made by the resetting means, wherein the informing means transmits the condition signal in a cycle of less than a half of a time constant of field current supplied to the electric generator, and wherein when a reset of the control circuit is made by the resetting means, the informing means sets a reset flag to a first value, cyclically transmits for a predetermined time period the condition signal which represents the first value of the reset flag, and then sets the reset flag to a second value, the first value of the reset flag indicating that a reset of the control circuit is made, the second value of the reset flag indicating that no reset of the control circuit is made, the predetermined time period being longer than at least twice the cycle in which the condition signal is transmitted.

2. The control apparatus as set forth in claim 1, wherein the command signal represents command values for power generation control parameters, and the condition signal represents actual values of the power generation control parameters.

3. The control apparatus as set forth in claim 1, wherein the power generation control parameters include an output voltage of the electric generator, field current supplied to the electric generator, and a duty of a power transistor for controlling the field current.

4. The control apparatus as set forth in claim 1, wherein the electric generator is an automotive alternator, the control apparatus is a voltage regulator for regulating an output voltage of the automotive alternator, and the external control apparatus is an engine control unit.

* * * * *